June 20, 1961

F. H. OSBORNE ET AL 2,988,945

ELECTRONIC MUSICAL INSTRUMENT

Filed July 7, 1958

INVENTORS.
Fred H. Osborne
John H. Riggs
Howard G. Bauer
By: Olson & Trexler attys.

June 20, 1961  F. H. OSBORNE ET AL  2,988,945
ELECTRONIC MUSICAL INSTRUMENT
Filed July 7, 1958  6 Sheets-Sheet 6

INVENTORS
Fred H. Osborne
John H. Riggs
Howard G. Bauer
By: Olson & Trexler
attys.

United States Patent Office 2,988,945
Patented June 20, 1961

2,988,945
ELECTRONIC MUSICAL INSTRUMENT
Fred H. Osborne, Snyder, John H. Riggs, Kenmore, and Howard G. Bauer, Tonawanda, N.Y., assignors to The Wurlitzer Company, North Tonawanda, N.Y., a corporation of Ohio
Filed July 7, 1958, Ser. No. 746,736
15 Claims. (Cl. 84—1.01)

This invention is concerned generally with the musical arts, and more particularly with an electronic organ.

Various types of electrical and electro-mechanical apparatus have been utilized heretofore for generating oscillations which are amplified and transduced, as in a loud speaker, to form tones simulating those of an organ. This invention is concerned with an electronic organ utilizing vacuum tubes or the like in oscillation circuits as tone generators. Electronic oscillation circuits generally produce sine waves. Only a very few instruments, notably the flute, produce sound waves of more or less sine form. Hence, something must be done to the generated waves in order to simulate a musical instrument.

It is undesirable to add a series of sine waves to simulate the harmonic content of a musical sound, inasmuch as the extreme compexilty of natural musical waves makes it extremely difficult to add the proper components in the proper amplitudes to simulate a given sound wave. In fact, a simple Fourier analysis of almost any musical wave indicates that it is substantially impossible fully to reproduce it by adding together a finite number of sine waves.

Hence, it is an object of this invention to provide a simple means for converting sine waves into waves of substantial harmonic content, whereby to simulate the musical sounds of an organ.

More particularly, it is an object of this invention to provide a device for distorting the sine wave of an electronic oscillator to produce waves of high harmonic content that readily can be utilized to simulate the tones of an organ.

More specifically, it is an object of this invention to provide an imperfect rectifying device for so distorting a sine wave as to produce a wave of high harmonic content to be used in simulating organ tones.

It will be obvious that all of the oscillators of an electronic musical instrument must bear a precise relation to one another or distinctly unmusical results will be obtained. In particular, the octavely related notes must be most precise in relation to one another.

Accordingly, it is another object of this invention to provide a generating system for an electronic organ comprising a plurality of extremely stable inductance tuned oscillators, there being one such oscillator for each note, and a plurality of dividing, cascade, or slave oscillators of inferior inherent stability respectively controlled by the stable oscillators as masters.

Another object of this invention is to provide an improved amplifier arrangement inhibiting interaction between the various generators.

Other and further objects and advantages of the present invention and will be apparent from the following description when taken in connection with the accompanying drawings wherein:

FIG. 4a shows the distorted wave form for providing tones other than the flute tones;

Figure 6A:
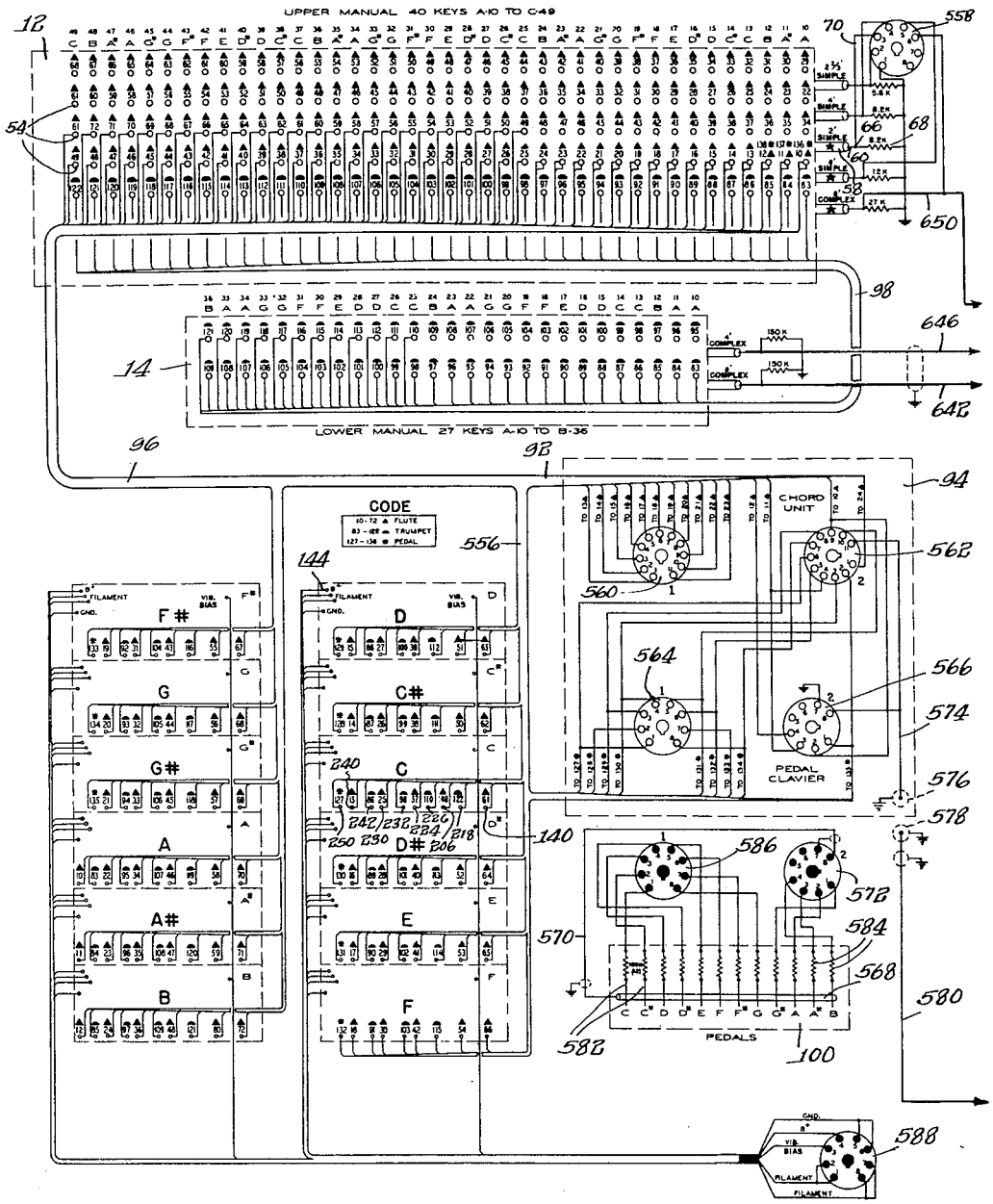
Figure 6B:
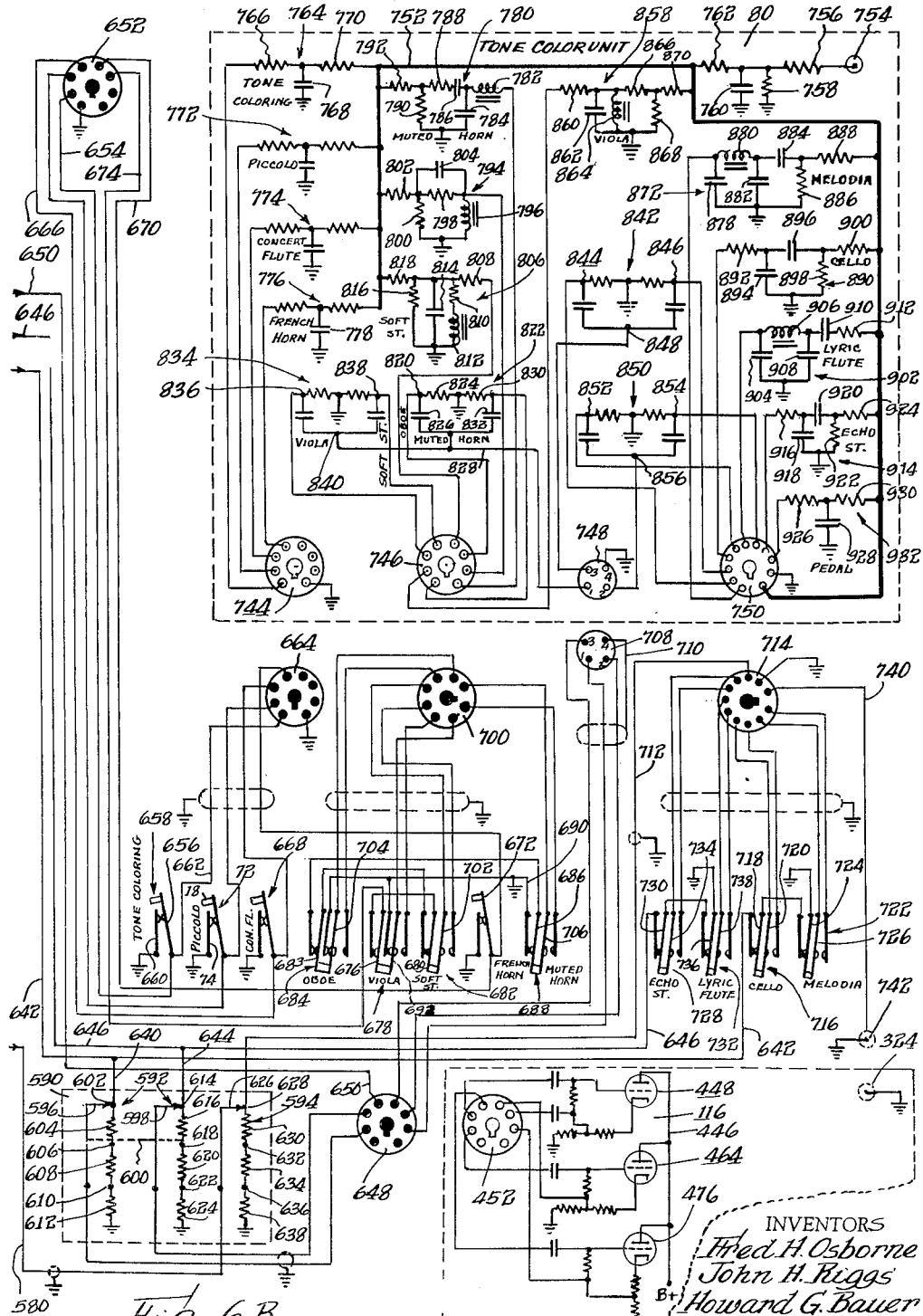

FIGS. 6A and 6B taken together illustrate certain of the wiring of the organ in schematic fashion.

Figure 1:
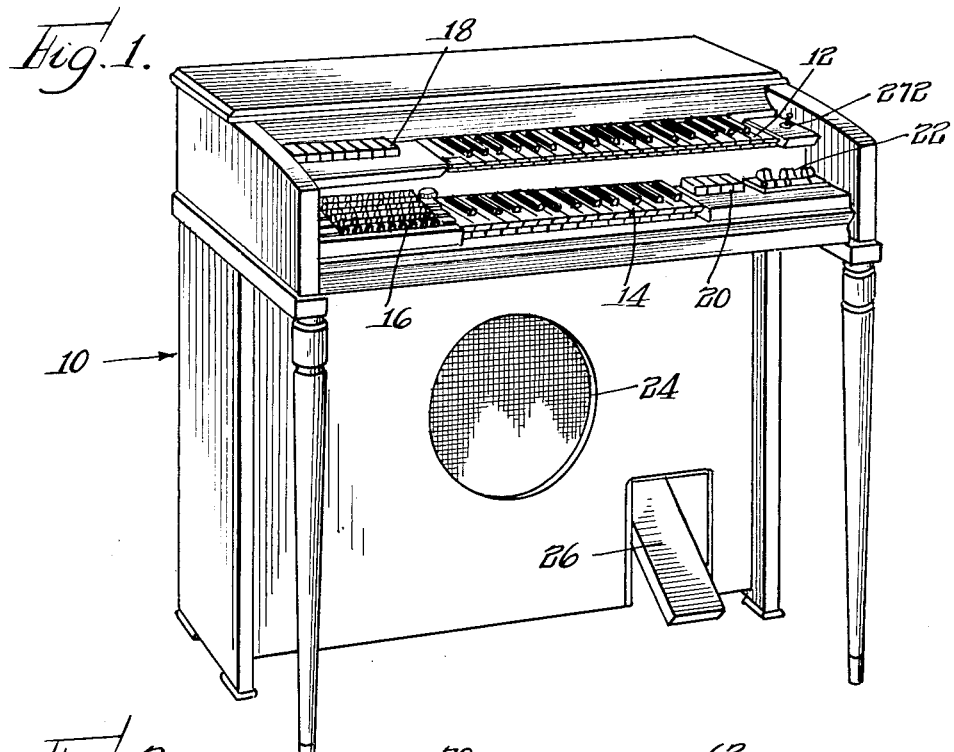
FIG. 1 is a perspective view of an organ embodying the principles of this invention.

Referring now in greater particularity to the drawings, and first to FIG. 1, there will be seen an organ console generally designated by the numeral 10 and including an upper keyboard 12 and a lower keyboard 14. A pedal clavier (not shown) optionally may be provided. In the organ shown, there is also a chord unit 16 having the proper connections for playing chords upon the depression of individual buttons.

The organ further includes stop tablets 18 and 20 adjacent the upper and lower keyboards respectively, and includes further controls at 22. A loud speaker is mounted in the front of the organ console as at 24, and a pivoted swell pedal 26 is provided at the front of the console for varying the volume of the music played.

Figure 2:
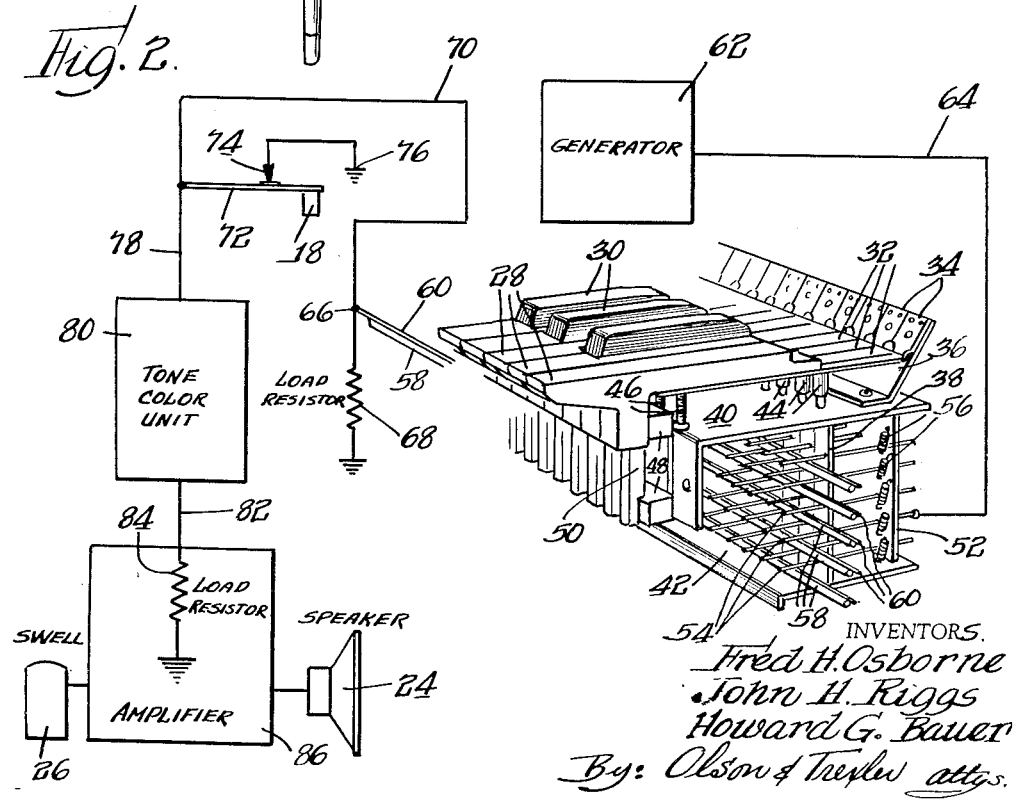
FIG. 2 is a schematic diagram showing some of the keys and key switches in perspective.

The keys and connections thereof are shown in FIG. 2. More particularly, there comprises a plurality of the usual white keys 28 and black keys 30 in either the upper keyboard or lower keyboard, the arrangement generally being the same. The keys preferably are of molded plastic, mounted on metal keybars 32, respectively connected by angular flexural springs 34 to a sheet metal mounting bracket 36. A plurality of key contact actuators 38 is mounted for sliding movement in suitable apertures in an upper plate 40, and a lower plate 42, fixed in relation to one another. There is one of the actuators 38 for each of the keys, and each actuator has an upstanding upper end provided with a rubber bumper 44 engaging the corresponding key bar 32 for depression of the respective actuators.

Each key is provided with a key stop 46, which provides also for levelling the keys. Fixed key bearings 48 are provided for cooperation with key guides 50 depending from the respective keys.

A key contact mounting block or plate of insulating material 52 is fixed in vertical position. A plurality of vertical rows of gold-plated contact wires 54 is fixed in the insulating mounting block 52 and projects forwardly therefrom, the wires of each vertical row or column projecting through the corresponding actuator 38 for flexing up and down thereby. There are five such contact wires in each vertical row or column, and there is an isolating resistor 56 associated with each such contact. A plurality of horizontally disposed insulating cylindrical rods 58 extends transversely of the contact wires 54. The rods respectively underlie the horizontally aligned contact wires, and in the illustrative embodiment there are five such rods, just as there are five contact wires in each vertical column. Each rod 58 carries a gold-plated wire 60 on its surface, extending longitudinally of the rod along the upper edge thereof for engagement by the wires 54 when the keys are depressed. As will be understood, the rods are of a suitable insulating material, such as phenolic resin or glass. The rods 58 and wires 60 are normally spaced somewhat below the wires 54. When one of the keys, as one of the keys 28 or 30, is depressed, the corresponding actuator 38 is lowered to deflect the wires 54 downwards. The deflected wires will engage the respective wires 60.

By way of example, in FIG. 2 there is indicated one of the tone generators 62 for the organ connected through a wire 64 to the rearwardly protruding end of one of the contact wires 54. When the key corresponding to this generator is depressed, it brings the corresponding wire 54 into engagement with the contact wire 60, and as will be seen this contact wire extends to the left to a terminal 66 above a load resistor 68. A wire 70 connects the terminal 66 to the corresponding stop tablet 18, or, more specifically to a switch arm 72 operated by the stop tablet 18. The switch arm 72 engages a contact 74 grounded at 76 when the stop tablet 18 is in "off" or non-playing position. When the stop tablet is moved to "on" or playing position, the switch arm 72 is moved away from the contact 74. Thus, when the switch is open, the electrical signals carried by the wire 70 will pass on to a wire 78, and hence to a tone coloring unit 80. On the other hand, when the switch is closed, the signals will be grounded, and the corresponding stop will not play.

The tone color unit is connected by a wire 82 to a load resistor 84 in the amplifier 86. The amplifier is controlled by the swell pedal 26, and feeds the loud speaker 24.

Figure 3:
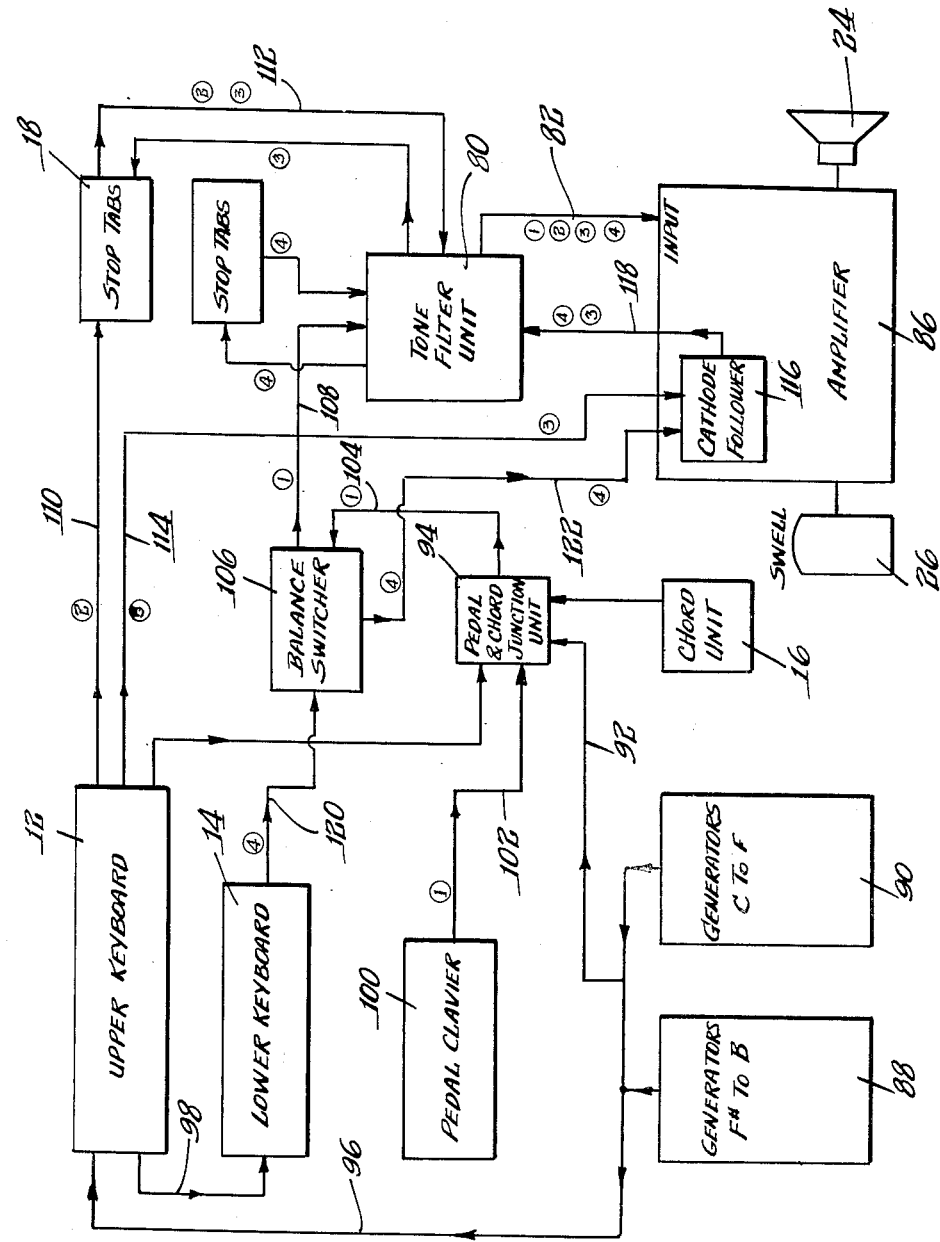
FIG. 3 is a block diagram illustrating the operation of the organ.

Before continuing with further details of the electronic organ, it is thought that understanding of the organ will be facilitated by reference to the block diagram of FIG. 3, taken along with the description immediately ensuing. Thus, the tone generators are grouped in two groups, namely the generators F# to B, as indicated at 88, and the generators C to F as indicated at 90. These generators are connected by a cable 92 to a pedal and chord junction unit 94, about which more will be said later. The generators also are connected by a cable 96 to the upper keyboard 12, and from the upper keyboard by another cable 98 to the lower keyboard. Various tone paths are indicated by numerals 1-4 on the drawing, and reference first should be had to the pedal clavier 100.

The pedal clavier has been omitted from the physical representation in FIG. 1, and is connected, as shown in FIG. 3, by a plug-in connection to be discussed in greater detail hereinafter. The connection of the pedal clavier is through a cable 102 to the pedal and chord junction unit. Certain of the oscillations transmitted by the cable 92 are connected to the pedal clavier and the cable 102 to suitable terminals in the pedal and chord junction unit 94, whereby to start the pedal clavier tones as indicated at 1.

The tone path 1 is continued from the junction unit 94 through a cable 104 to a balance switcher 106 which is provided for balancing the various tone controlling components of the organ. The tone path 1 continues from the balance switcher 106 through a cable 108 to the tone filter unit 80 previously indicated. The tone path 1 then continues through the previously mentioned connection or cable 82 through the input of the amplifier 86, and hence to the loud speaker 24.

The tone path 2 starts with the upper keyboard 12, and is provided for simple or substantially sine wave tones. The path 2 passes from the upper keyboard 12 through a cable 110 to the stop tablets 18, and hence through a cable 112 to the tone filtering unit 80. Tone path 2 continues through the aforesaid cable 82 to the input of the amplifier.

Tone path 3 also starts from the upper keyboard with a cable 114. Tone path 3 comprises complex or non sine wave tones. The cable 114 goes to a cathode follower 116 in the amplifier 86, and the output of the cathode follower is connected by a cable 118 to the previously mentioned tone filter unit 80. Tone path 3 then joins with the first two tone paths, continuing through the cable 82 to the input of the amplifier 86.

The fourth tone path starts with the lower keyboard. A cable 120 leads from the lower keyboard to the balance switcher 106. From here, another cable 122 leads to the cathode follower 116, the output of which goes through the cable 118 to the tone filtering unit 80, and hence through the cable 82 to the input of the amplifier 86. The cathode follower 116 prevents any interaction among the various complex tone signals as transmitted by the paths 3 and 4.

Figure 4:
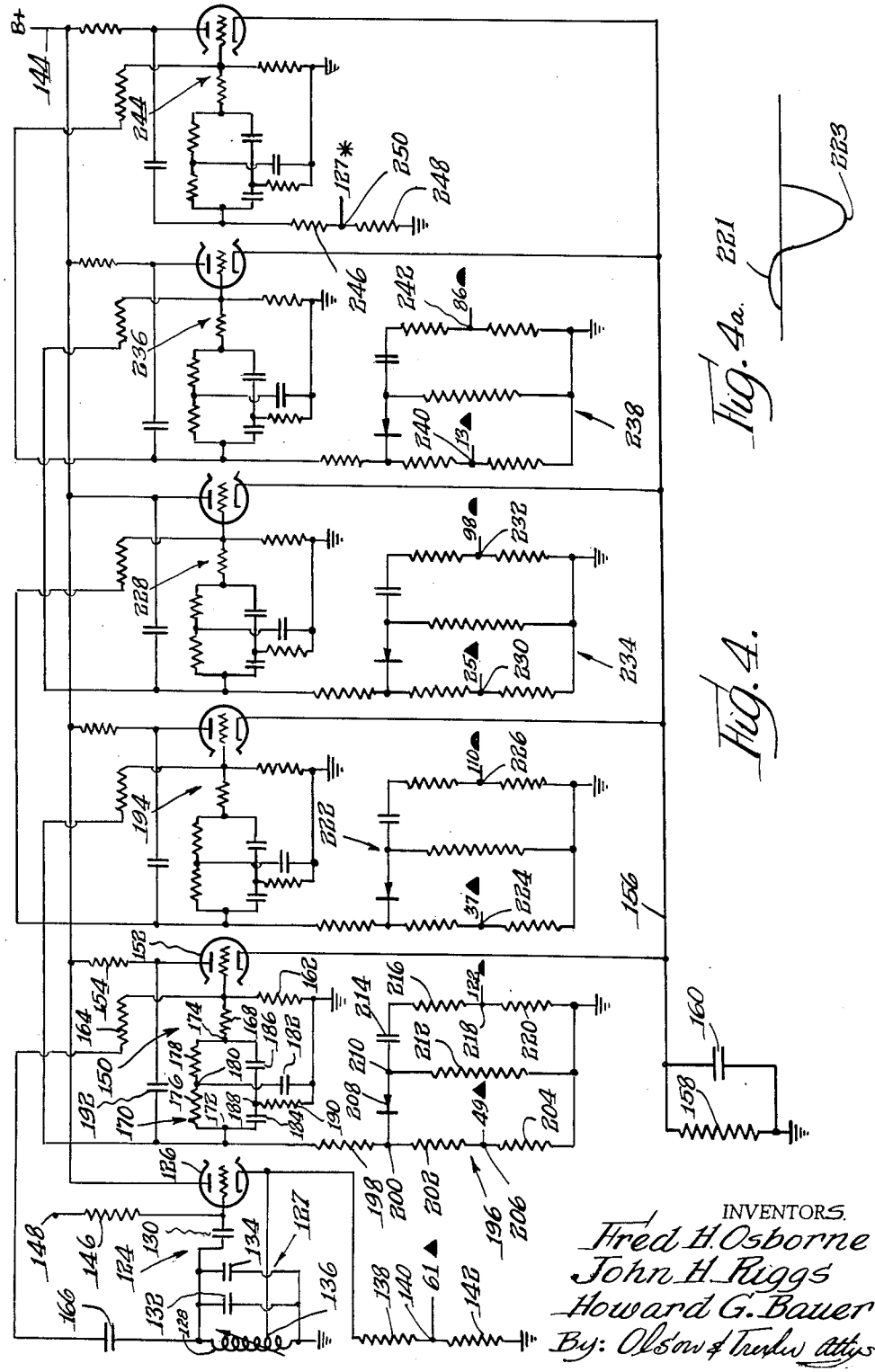
FIG. 4 is a schematic wiring diagram illustrative of all of the tone generators, and showing one particular cascade of oscillators, comprising a master and a plurality of slaves, being the octavely related notes of any given note.

Reference now should be had to FIG. 4 wherein one cascade of tone generators is shown. The remaining cascades are similar except for circuit values.

In one exemplary embodiment of the organ, there are six octaves of musical tones. The upper or sixth octave audio frequency generators serve as master oscillators and are very stable Hartley slug tuned oscillators. All twelve master sixth octave oscillator coils are identical. Part of the coil is in the cathode circuit, and part in the grid circuit of the half section of a 12AX7 tube. Capacitors are connected across the coils, and vary in value depending on the note being generated. The exact frequency of oscillation is fine controlled by varying the position of the tuning slug in the coil.

The fifth, fourth, third, second and first octave oscillators are parallel-T circuits. These oscillators are referred to as slave oscillators. Each slave oscillator is actually an independent oscillator, but has less inherent frequency stability than the master oscillators, and is controlled in frequency by the master oscillator. More particularly, the master for each note controls the first, the first slave controls the second, and so on.

More particularly, the master and slave oscillators comprising the series of cascade for producing the C notes of the organ is shown in FIG. 4. The master oscillator, indicated by the numeral 124 corresponds to C-61, the sixty-first note on the scale of the instrument. This oscillator is a Hartley oscillator, comprising a triode section 126 of a twin triode vacuum tube, such as a 12AX7. A tank circuit 127 is connected to the cathode and to the control grid of the tube section 126, and comprises a slug tuned inductance 128 grounded at one end, and connected at the other end through a coupling capacitor 130 to the grid of the tube section 126. A pair of capacitors 132 and 134 is connected in parallel across the inductance 128. A tap 136 on the inductance 128 is connected directly to the cathode of the tube section 126. The cathode is connected through a resistor 138 to a terminal 140, and from the terminal 140 through a resistor 142 to ground. The output of the master oscillator is taken at the terminal 140, and the code for the wiring as illustrated in FIGS. 6A and 6B is indicated to the right of the terminal. It will be appreciated that the output at the terminal 140 is substantially a sine wave or a simple output. The upper tones of the organ, as most musical instruments, are very nearly pure sine waves with few, if any, harmonics.

The plate of the tube section 126 is provided with potential directly from a B+ bus line 144. The grid, previously mentioned, is connected through a resistor 146 to a terminal 148. The vibrato bias from the amplifier, to be described hereinafter, may be applied to this terminal to vary the frequency of the tone generated at a sub-audio or vibrato frequency.

The first slave oscillator, namely that for the fifth octave, is indicated at 150. As previously noted, this oscillator is of the parallel-T type. It includes another triode tube section 152, the plate of which is connected to the B+ bus through a plate load resistor 154. The cathode is connected to a common cathode line 156 which is grounded through a cathode load circuit comprising a parallel connected resistor 158 and capacitor 160.

The grid of the tube section 152 is grounded through a resistor 162 of relatively high value, and is coupled to the tank circuit 126 of the master oscillator through a resistor 164 and a coupling capacitor 166. The grid also is connected through a resistor 168 to a parallel-T circuit 170. The parallel-T circuit comprises a pair of junctions 172 and 174. A series connected pair of resistors 176 and 178 is connected between the junctions 172 and 174 and has an intermediate junction 180 grounded through a capacitor 182. Also connected between the junctions 172 and 174 is a pair of capacitors 184 and 186 having an intermediate junction 188 grounded through a resistor 190.

The feedback circuit from the plate to the parallel-T circuit comprises a capacitor 192.

The junction 174 is connected to the resistor 168, as previously implied. The junction 172 is connected to the feedback capacitor 192, and also to the grid of the succeeding slave oscillator, indicated generally by the numeral 194. This succeeding oscillator 194 also is of the parallel-T type, and is similar to the one just described except for the circuit values.

The junction 172 further is connected to an output circuit indicated generally at 196. The connection from the junction 172 to the output or filter circuit 196 is made through a resistor 198 of rather high value to a terminal point 200. The terminal 200 is connected to a voltage divider comprising a relatively high value resistor 202 and a relatively low value resistor 204 to ground. An output terminal 206 is provided between the two resistors 204 and 202. This output is of the simple or substantially sine wave variety, and the output terminal is coded in accordance with the wiring diagram to be discussed later.

A positive terminal of a selenium diode 208 is connected to the junction 200, the negative terminal being connected to a junction 210. The junction 210 is connected through a very high resistance resistor 212 to ground, and also is connected through a capacitor 214 to a voltage divider comprising a resistor 216 connected at an output terminal 218 to a resistor 220, the opposite end of which is grounded. A complex or nonsine wave output is taken at the terminal 218, and the code thereof is indicated in accordance with the wiring diagram of FIGS. 6A and 6B.

The manner in which the output becomes complex or nonsine wave is of considerable interest. The oscillation at 200 is a sine wave, as will be understood. If the selenium rectifier 208 were a perfect rectifier, then it would pass all of one half of the sine wave, and none of the other half. However, the selenium diode rectifier is not perfect. It has an appreciable back resistance, and hence passes a certain amount of current in the wrong direction. Thus, as is indicated in Fig. 4a a distorted wave is produced, having a rather low or "chopped off" amplitude as indicated at 221, as produced by the back resistance, and having the full half sine wave as indicated at 223. This distorted wave form has a great many harmonics, and suitable filtering circuits are provided as hereinafter set forth to utilize the harmonics as desired for producing musical tones having harmonics.

The slave oscillator 194 for the fourth octave is similar to the oscillator 150, except for circuit values. The output or filter circuit 222 is identical with the corresponding circuit 196, a simple output being provided at the terminal 224, and a complex output being provided at the terminal 226.

The third octave slave oscillator 228 is similar to the previous two slave oscillators and has the grid thereof controlled by the fourth octave slave oscillator 194, in the manner heretofore indicated. The simple output is taken at 230, and the complex output at 232, the output or filter network 234 being identical with the corresponding network 196.

The second octave slave oscillator 236 is similar to the previous slave oscillator, and has its frequency controlled by the preceding slave oscillator 228. The output or filter circuit 238 again is identical with the preceding ones, and has a simple output at the terminal 240, and a complex output at the terminal 242.

The final or first octave slave oscillator 244 is similar to the preceding slave oscillators, and is constructed somewhat different, comprising a voltage divider having a resistor 246 and a resistor 248, the latter being grounded, and the series combination having an intermediate output terminal 250 providing a simple output. The resistors 246 and 248 correspond to the resistors 202, 206, but are of different value.

Although one cascade of oscillators has now been fully disclosed, certain typical component values are set forth hereinafter by way of illustration. For example, each of the triode tube sections comprises one half of a 12AX7 tube in one embodiment of the invention. In the master oscillator circuit, the capacitor 132 is a .022 mfd. capacitor, while the capacitor 134 has a value of .0027 mfd. The capacitor 130 is .001 mfd., as is the capacitor 166. The resistances of the voltage divider are 150K for the resistor 138, and 82K for the resistor 142. The resistor 146 leading to the vibrato bias is 150K.

In the first slave oscillator 150, the coupling resistor 164 is selected between values of 680K to 1.2M, while the coupling or feedback capacitor 192 is .01 mfd. The load resistor 154 is 270K. Resistors 176 and 178 are respectively 330K and 560K, while the resistor at 168 is 270K. The capacitors 184 and 186 are respectively .00075 mfd. and .0006 mfd., the capacitor 182 being .0012 mfd. The resistor 190 is selected between 8.2K and 22K. The grid bias resistor 162 is 1 meg.

In the output or filter circuit 196, the resistors 198 and 202 are each 1 meg., while the resistor 204 is 47K. The resistor 220 also is 47K, and the resistor 216 is 470K. The resistor 212 is 10 meg. The capacitor 214 is .0039 mfd.

Corresponding values of the remaining output or filter circuits are the same, except in the first octave stage associated with the amplifier 244, wherein the resistor 246 is 2.2 meg. and the resistor 248 is 39K. Other resistor and capacitor values in the succeeding slave oscillator circuits vary somewhat from the illustrative examples, as will be apparent to those skilled in the art. In the other oscillator strings or cascades (not shown) the circuit values in many instances vary, as will be apparent, in accordance with the different frequency requirements. However, the output or filter circuits are similar in most instances to those disclosed.

Figure 5:
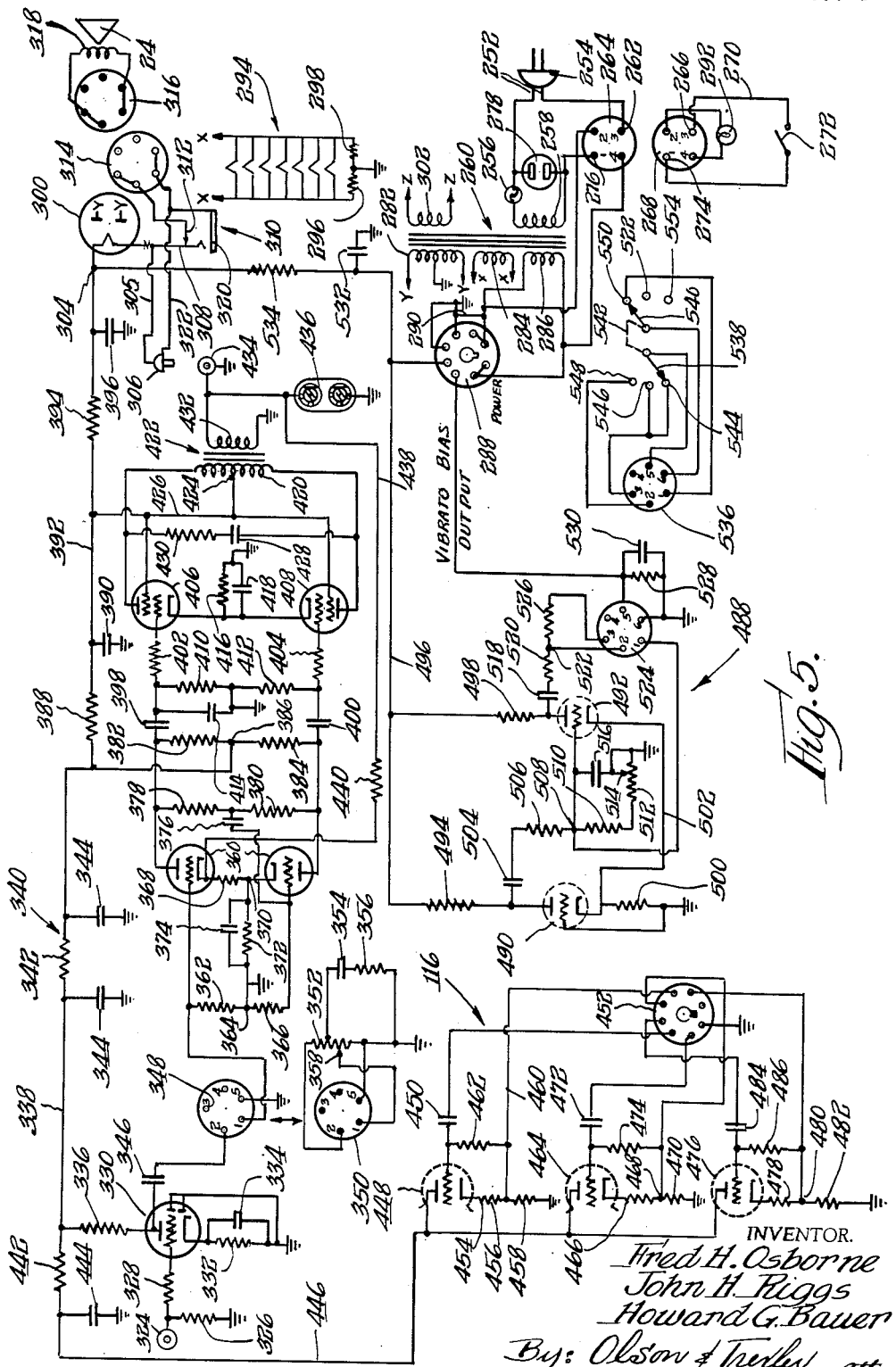
FIG. 5 is a schematic wiring diagram of the amplifier.

References now should be had to FIG. 5 for a description of the organ amplifier. Starting at the lower right hand corner of the figure, there is schematically illustrated the usual line cord 252 having a plug 254 at the end thereof. One side of the line is connected through a fuse 256 to one end of the input winding 258 of the power transformer 260. The other side of the line 252 leads to a contact 262 of a line switch socket 264 in the organ tone cabinet. A complementary prong 266 of a line switch plug 268 is connected to line 270 leading to a switch 272 adjacent the lower keyboard of the organ for turning the instrument on and off. The other side of the line switch 272 is connected to another prong 274 of the plug 268, and hence to a corresponding contact 276 of the socket 264, and hence to the opposite end of the primary winding 258. A receptacle 278 is connected in parallel with the primary winding, thus providing a convenient outlet for a technician to work on the organ.

The iron core 280 of the transformer 260 is conventionally illustrated. A center tapped high voltage secondary winding is indicated at 282, the opposite ends of which are labeled Y—Y, indicating connection to a rectifier tube as hereinafter set forth. There is also a 6.3 volt secondary winding 284, the ends of which are conventionally indicated at X—X for the filaments of the various tubes in the organ. There is also a 12.6 volt secondary winding 286 the opposite ends of which lead respectively to pins 1, 2 and 7, 8 of a power socket 288. The pins 7, 8 are connected by a jumper 290 to pins 5 and 6, and also to ground. In addition, the ends of the secondary winding 286 arec onnected to contacts 2 and 4 of the line switch socket 264, and hence through the corresponding prongs of the line plug switch to a pilot lamp 292.

Referring now to the upper right hand corner of FIG. 5, there will be seen a filament string or ladder 294 with the transformer connections indicated at X—X. The specific relation of the filaments to the tubes will be hereinafter indicated by application of the identifying numbers of the tubes to the string 294. It will be observed that at the bottom of the string there is a ground connection between a resistor 296 and a resistor 298 connected across the filaments. By way of example, the resistor 296 may be 220 ohms, and the resistor 298 may be 330 ohms.

A rectifier tube 300, which may be of the 5U4 type, has the plates thereof connected at Y—Y to the center tapped transformer secondary 282. The opposite ends of the directly heated cathode are connected at Z—Z to a five volt secondary winding 302 of the power transformer 260. The cathode also is connected to supply voltage to a B+ terminal 304, and at the opposite end is connected to the center wire 305 of a speaker cable connected to a speaker plug 306. The wire 305 is connected to the center contact 308 of a phone jack 310, and through an internal switch therein at 312 to pins 3 and 4 of a speaker socket 314. The corresponding pins of a speaker plug 316 are connected to one side of the voice coil 318 of the loud speaker 24. The other side of the voice coil is connected to pins 1 and 2 of the speaker plug 316, and through the corresponding contacts of the socket 314 to the outer or ring contact 320 of the phone jack, and also to the other wire 322 leading to the speaker plug 306.

Referring now to the upper left hand corner of FIG. 5, the amplifier has an input receptacle or jack 324 having a shunting resistor 326 to ground and the connecting resistor 328 to the control grid of an input or preamplifier tube 330. The preamplifier tube is provided with the usual cathode self bias by means of a resistor 332 and a capacitor 334, and receives plate voltage through a load resistor 336 from a B+ line 338. By way of example, the tube 330 is of the 6AB6 type. The diode plates of the tube are not used, but are simply connected to ground. By way of example, the resistor 326 may be 1 meg., the resistor 328 may be 10K, the resistor 336 may be 270K, the resistor 332 may be 3.9K and the fastener 334 may be 25 mfd.

The B+ 338 is filtered by a pi filter 340 comprising a resistor 342 and a pair of shunting capacitors 344. The capacitors may be 20 mfd., and the resistor 4.7K. The output of the preamplifier tube 330 is connected through a coupling capacitor 346 of .1 mfd., it being understood that this and subsequent values are set forth only by way of illustration.

The capacitor 346 is connected to pin 2 of a swell plug 348. The corresponding pin of the complementary swell socket 350 is connected to the top end of a potentiometer resistor 352, the lower end being grounded, and part of the resistor 352 being by-passed by the series combination of a capacitor 354 and a resistor 356. The potentiometer resistor 352 is 100K, the resistor 356 is 18K and the capacitor 354 is .1 mfd. The bottom or grounded end of the potentiometer resistor 352 is connected to pin 5 of the plug 350, the corresponding contact of the socket 348 being grounded. The sliding tap 358 on the potentiometer resistor is connected to pin 1 of the lug, and through the corresponding contacts of the socket to the input of a 12AX7 phase inverter indicated at 360. The connection is direct to one control grid of the tube 360, and leads to the other control grid through a 470K resistor 362, a connection 364, and another 470K resistor 366. The connection 364 is grounded. The cathode of the first or upper half of the tube is connected through a cathode biasing circuit comprising a 1K resistor 372, and a 25 mfd. capacitor 374 in parallel therewith, to ground. The control grid of the second half of the tube 360 further is connected through a .047 mfd. capacitor 376 to the junction between a pair of 100K resistors 378 and 380, respectively connected to the plates of the tube. The plates also are connected to the opposite ends of a pair of resistors 382 and 384, connected to a junction 386 leading to the B+ line 340, the latter being connected through a decoupling 4.7K resistor 388 and shunting 20 mfd. capacitor 390 to a B+ bus 392. The B+ bus further is connected through a decoupling resistor 394 of 100 ohms, and a shunting 30 mfd. capacitor 396 to the B+ terminal or connection 304 on the cathode of the rectifier tube 300.

The plates of the tube 360 are respectively connected through .047 mfd. capacitors 398 and 400, and 100 ohm resistors 402 and 404, respectively in series therewith, to the control grids of a pair of 6V6 power output tubes 406 and 408. The grids are provided with 470K grid resistors 410 and 412 connected to ground, and the grid of the upper tube 406 further is shunted by a 470 mmfd. capacitor 414 to ground.

The cathodes of the tubes 406 and 408 are self biased in common by a 250 ohm resistor 416 and shunting 25 mfd. capacitor 418. The plates are connected to the opposite end of the input winding 420 of an output transformer 422. The primary winding is center tapped at 424, and is connected by a wire 426 to the B+ bus 392. The screen grids of the tubes 406 and 408 are connected to the wire 426. A .0005 mfd. capacitor 428 is connected across the plates of the tubes, the capacitor being in series with a 10K resistor 430.

The output winding 432 of the output transformer 422 is grounded at one end, and has the other end connected to a jack 434 cooperable with the plug 306. The ungrounded end of the output winding also is connected to an auxiliary speaker socket 436, and to a negative feedback line 438. The line 438 is connected through a 6.8K resistor 440 to the upper cathode of the tube 360.

At the lower left corner of FIG. 5 there will be seen the cathode follower 116 previously mentioned in connection with FIG. 3. Actually, the cathode follower comprises three separate cathode follower circuits, all of which receive plate potential from the B+ line 338 through a 4.7K resistor 442 and shunting capacitor 444 and a line 446. The line 446 is connected to the plate of a tube 448 comprising one half of a 12AU7 tube. The grid is connected through a .047 mfd. capacitor 450 to contact 3 of a socket 452. The cooperating plug will be discussed later. The cathode of the tube 448 is connected to a 1K resistor 454, the latter being connected at a junction 456 to a 10K resistor 458, the opposite end of which is grounded. The connection or junction 456 is connected by a wire 460 to pin 6 of the socket 452. A 1 meg. resistor 462 is connected from the grid to the wire 460.

The second cathode follower comprises a triode tube 464 which preferably is the second section of the same 12AU7 tube as is the triode tube 448. The cathode in this instance is connected through another 1K resistor 466 to a junction 468, the latter being connected to a grounded 10K resistor 470. The junction 468 is connected to pin 5 of the socket 452. The control grid of the tube 464 is connected through a capacitor 472 of .047 mfd. to pin 2 of the socket 452. Again, a 1 meg. resistor 474 connects the grid to the junction 468.

The third cathode follower comprises a tube 476, preferably a 6C4. The plate, like the plates of the two preceding cathode followers, is connected to the B+ line 446. The cathode is connected through a 1K resistor 478 to a junction 480, the latter being connected to a grounded 10K resistor 482. The junction 480 is connected to pin 7 of the socket 452. The grid of the tube 476 is connected through a .047 mfd. capacitor 484 to pin 4 of the socket 452. A 1 meg. resistor 486 is connected from the grid of the tube 476 to the junction 480.

A vibrato oscillator 488 also is included in the amplifier. The vibrator oscillator comprises a pair of triode tube sections 490 and 492, conveniently comprising the halves of a 12AU7 tube. The plate of the triode section 490 is connected through a 100K load resistor 494 to a B+ line 496 connected to the B+ terminal 304. The plate of the triode section 492 is conected through a 15K resistor 498 to the B+ line 496.

The grid of the triode section 490 is grounded, while the cathode is connected to ground through a 2K resistor 500. The cathode of the tube section 492 is connected directly to the cathode of the tube section 490 by a wire 502. The plate of the tube section 490 further is connected by a .039 mfd. capacitor 504 to a 560 K resistor 506 which is connected to a junction 508. The junction is connected directly to the grid of the triode section 492, and is connected through a 330 K resistor 510 to a 500 K potentiometer resistor 512, the opposite end of which is grounded. The sliding tap 514 on the potentiometer resistor is grounded, and also is connected through a .039 mfd. capacitor 560 to the grid of the triode section 492.

The plate of the tube section 492 is connected through a .47 mfd. capacitor 518 and a series 82K resistor 520 to a junction 522. The junction 522 is connected directly to pin 2 of a vibrato socket 524, and is connected through a 100K resistor 526 to pin 3 of the vibrato socket. Pin 6 of the vibrato socket is grounded, while pin 5 is connected through a 2.7K resistor 528 and a parallel .047 capacitor 530 to the grounded pin 6. Pin 5 also is connected to pin 3 of the power socket 282, previously mentioned. Pin 4 of the power socket is connected to the B+ line 496, and it will be observed that this line has a shunting 100 mfd. capacitor 532 and a series connected 1250 ohm resistor 534.

A vibrato plug 536 is provided for cooperation with the vibrato socket 524, and is connected by means of a cable to switches operated by one of the controls 22 previously mentioned. More particularly, the switches comprise a movable switch arm 538 and a movable switch arm 540, ganged for operation together as indicated at 542. The switch arm 538 is connected to pin 5 of the plug 536, and hence through the socket 524 to pin 3 of the power socket 288, and hence constitutes a vibrato output. As subsequently will be discussed, this vibrato output is applied to the terminal 148 of each master oscillator when it is desired for the vibrato to operate.

Switch arm 540 is connected to pin 6 of the vibrato plug, and hence is grounded through the vibrator socket. The arm 538 is engageable with three fixed contacts 544, 546, and 548, respectively comprising "off," "medium," and "full" position for the vibrato. Similarly, the switch arm 540 cooperates with three fixed contacts 550, 552, and 554, corresponding in the same order with the previously mentioned fixed contacts. The "off" contact 544 is connected to pin 3 of the plug 536, as is the "medium" contact 546. The "full" contact 548 is connected to pin 2 of the plug 536. The "off" contact 550 is connected to pin 1 of the plug 536. Hence, when the switches are in "off" position, the grid of the oscillator tube section 492 is grounded through the switch arm 540. Hence, the vibrato oscillator will not oscillate. Since the contacts 552 and 554 are not connected to anything, the grid is ungrounded with the switches in either the "medium" or "full" position, and the vibrato oscillator will oscillate. The intensity of the vibrato is determined by the switch arm 538. Thus, when it is on the contact 546 the vibrato is taken at lesser amplitude from the end of the resistor 526. However, when the switch arm is on the "full" contact 548, the vibrato is taken at full amplitude from the junction 522. The speed of the vibrato is determined by the position of the tap 514 on the potentiometer resistor 512.

A schematic layout of the various wiring connections of the organ is shown in FIGS. 6A and 6B, the tone generators and keys being indicated in FIG. 6A, and stop switches, tone coloring unit, and ancillary parts being shown in FIG. 6B. Referring first to FIG. 6A, it will be seen that the wiring connections are coded by numerals and symbols, and hence an extensive description thereof is not necessary. However, referring slightly to the left of center and toward the bottom of FIG. 6A, there will be seen the C generator described in connection with FIG. 4. The output connections thereof are indicated by the same numerals and by the same symbols as in FIG. 4. These output connections are connected by means of a sub-cable 556 to the cable 96 discussed in connection with FIG. 3. The wires in the cable are connected to the bottom three lines of wires or whiskers 54, discussed in connection with FIG. 2. The specific connections readily can be made out by the coding, both for the C generator, and for the other generators. The top two rows of wires 54 are connected by various internal connections to receive signals from the bottom three rows, in accordance with the coding. In this connection, it will be noted that part of the third row from the bottom does not receive signals directly by connection to the cable 96, but rather is wired internally to certain of the other connections in the bottom three rows. Somewhat similarly, the lower manual 14 is connected through the cable 98 to respective contacts in the upper manual 12.

Referring to the upper right corner of FIG. 6A, it will be seen that numerals have been applied in connection with the 2′ simple tones corresponding to the numerals applied to FIG. 2. Thus, the output connection 66 and the wire 70 will be seen to lead to pin 3 of a socket 558. The subsequent connections through the socket will be discussed in connection with FIG. 6B. Wiring of the remaining contacts of the upper manual and the socket 558 is clearly shown in FIG. 6A. The lower manual output is connected directly to other parts of the organ, and this also will be discussed in connection with FIG. 6B.

As previously indicated in connection with FIG. 3, a cable 92 leads from the tone generators to a pedal and chord junction unit 94, also shown in FIG. 6A. In the junction unit 94 there are two chord unit sockets 560 and 562 for connection to the chord playing unit 16. As noted heretofore, the chord playing unit constitutes the subject of another patent application, and will not be discussed further except to note that the specific connections are clearly indicated by the numeral and design code previously discussed.

The junction unit 94 also includes two pedal sockets 564 and 566, respectively.

The pedal clavier or unit 100 is indicated schematically at the lower right corner of FIG. 6A. This is quite similar to the manuals discussed in connection with FIG. 2, but there is only one flexible wire associated with each pedal. Thus, there is a fixed conductive common rod or contact 568 corresponding to the wire 60 on each of the insulating rods 58 in FIG. 2. This rod is connected by a wire 570 to pin 8 of a pedal plug 572. Corresponding contact 8 of the pedal socket 566 is connected to an output wire 574 which is connected to a jack 576. A cooperating plug 578 is connected to a pedal and chord output wire 580. There is a plurality of flexible contact wires 582 respectively operated by the pedals and engageable with the common wire or rod 568. These wires are connected through 100K resistors 584 to the various pins of the pedal plug 572 and a second pedal plug 586, and are wired through the corresponding sockets to the appropriate tone generators, in accordance with the code heretofore discussed.

The final item in FIG. 6A is a power plug 588 cooperable with the power socket 288 of FIG. 5. Vibrato bias is applied to the tone generators through this plug and socket from the vibrato oscillator. Filament power also is supplied, as is B+ power and ground, all as clearly indicated in FIG. 6A, when taken in connection with FIG. 5.

Referring now to FIG. 6B, and first to the lower left corner thereof, there will be seen a switch unit 590 controlled by two of the controls 22. This switch unit comprises a lower manual balance switch 592, and a pedal balance switch 594. The lower manual balance switch is provided for balancing the relative amplitudes of the lower and upper manuals, while the pedal balance switch balances the composite of the chord unit and pedal outputs with the manuals. The chord unit is provided with a separate balance control so that its amplitude relative to that of the pedals may be varied.

The lower manual balance switch comprises a pair of movable switch arms 596 and 598.

The two switch arms are ganged together at 600 for simultaneous operation by one of the controls 22. The switch arm 596 is shown as cooperating with a fixed contact 602. This contact is connected through a 22K resistor 604 to a fixed contact 606. The latter is connected to a 7.5K resistor 608 to a fixed contact 610, the latter being connected to a grounded resistor 612 of 7.5K. Similarly, the switch arm 598 is shown as engaging a fixed contact 614 connected to the upper end of a 22K resistor 616. The lower end is connected to a fixed contact 618, which in turn is connected to a 7.5K resistor 620. The latter is connected to a fixed contact 622, and this in turn is connected to a grounded resistor 624 of 7.5K. The amplitude of the lower manual relative to the upper manual is determined by simultaneously moving the switch arms 596, 598 along the various pairs of contacts 602, 614 and 606, 618, and 610, 622.

The pedal balance switch 594 is of generally similar construction, comprising a single movable switch arm 626 connected to the chord and pedal output wire 580. The arm 626 is shown as resting on a fixed contact 628 which is connected to the upper end of a 39K resistor 630. The other end of this resistor is connected to a fixed contact 632, and this in turn is connected to a 27K resistor 634. The latter is connected to a fixed contact 636, and this in turn is connected to the upper end of a 22K grounded resistor 638.

The fixed contact 602 of the lower manual balance switch is connected by a wire 640 to a wire 642 which leads to the 8' complex output of the lower manual. Similarly, the fixed contact 614 is connected by a wire 644 to a wire 646 which leads to the 4' complex output of the lower manual. The respective switch arms 596 and 598 are connected to pin 2 and pin 3 of a plug 648 which cooperates with the socket 452 associated with the cathode follower circuit 116. The cathode followers and the socket 452 are reproduced in FIG. 6B at the lower right corner thereof for clarity of illustration. Thus, it will be seen that the outputs of the lower manual are complex, and are connected to the grids of the cathode follower tubes 448 and 464. The other complex output is found in the upper manual and is connected by a wire 650 directly to pin 4 of the plug 648. This connection is through the socket 452 to the grid of the cathode follower 476. Thus, the cathode followers positively prevent any possibility of interaction among the complex tones.

At the upper left corner of FIG. 6B there is shown a plug 652 cooperable with the socket 558 of FIG. 6A. The pins of this plug pick up the various outputs of the upper manual, and are connected through a group of stop switches hereinafter to be described, and operated by the stop tablets 18. Connections further will be set forth to stop switches operated by the stop tablets 20 for the output of the lower manual.

More particularly, pin 2 of the plug 652 is connected by a wire 654 to the movable switch arm 656 of a tone coloring stop switch 658. The movable contact or arm normally engages a fixed grounded contact 660, and additionally is connected by a wire 662 to pin 1 of a plug 664.

Pin 3 of the plug 652 is connected to the movable arm of a piccolo stop switch 72, and on to pin 2 of the plug 664. The piccolo stop switch is similar to the previously mentioned stop switch. Arm 74 of the piccolo stop switch was disclosed in connection with FIG. 2. Pin 4 of the plug 652 is connected by a wire 666 to the movable arm of a concert flute stop switch 668 of similar construction, and on to pin 3 of the plug 664.

Pin 5 of the plug 652 is connected by a wire 670 to the movable switch arm of a similar French horn stop switch 672, and on to pin 4 of the plug 664.

Pin 6 of the plug 652 is connected by a wire 674 to a movable arm 676 of a viola stop switch 678. This movable arm normally engages a fixed arm connected through a wire to the movable arm 680 of a soft string stop switch 682. The movable arm 680 normally engages a fixed arm which is connected through a wire to the movable arm 683 of an oboe stop switch 684. This movable arm in turn engages a fixed arm which is connected by a wire to a movable arm 686 of a muted horn stop switch 688. This movable arm normally engages a grounded wire 690.

The viola stop switch 678 includes another movable arm 692 which normally engages a fixed grounded arm, but which is movable simultaneously with the switch arm 676 into contact with a fixed switch arm which is connected by a wire to pin 3 of a plug 700.

The soft string stop switch 682 includes a second movable switch arm 702 which is connected to the switch arm 680 electrically and for movement therewith, and which engages upon such movement a fixed switch arm connected to pin 4 of plug 700.

The oboe stop switch 684 has a second movable switch arm 704 which also is mechanically and electrically connected to the first mentioned movable switch arm 683. The movable switch arm 704 normally engages a grounded fixed switch arm, but is movable with the switch arm 683 away from this grounded switch arm, into engagement with a switch arm connected to pin 6 of the plug 700.

The muted horn stop switch 688 also is provided with a second movable switch arm 706. This is mechanically and electrically connected to the movable switch arm 686. It normally is not in engagement with any fixed contact, but is movable into engagement with a fixed contact connected to pin 1 of the plug 700.

It will be understood that in connection with all of the stop switches heretofore mentioned, and the few shortly to be mentioned, that the position considered to be normal is the "off" position.

To the right of the plug 700 there is shown a four contact plug 708. The first pin of this plug is connected to pin 7 of the plug 648. Pin 2 thereof is connected to pin 6 of the plug 648, while pin 3 of plug 708 is connected to pin 5 of plug 648. These three connections comprise the outputs of the cathode followers. Pin 4 of the plug 708 is connected to the shield 710 for the wires connected to the first three plugs. Pin 4 is grounded through the corresponding socket which will be discussed later.

The output of the pedal balance switch 694 as taken from the contact 628 is connected by a wire 712 to pin 9 of a plug 714.

The wire 642, besides being connected by the wire 640 to the left side of the lower manual balance switch 692, is also connected to a fixed switch arm of a cello stop switch 716. This fixed switch arm normally is engaged by a movable switch arm 718 which is mechanically and electrically connected to a movable switch arm 720, the latter being connected to pin 4 of the plug 714. The movable switch arm 720, when moved, engages a fixed switch arm which is connected to pin 3 of the plug 714.

The movable switch arm 718 of the cello stop switch 716 is connected by a wire to a fixed switch arm of a melodia stop switch 722. This fixed switch arm normally is engaged by a movable switch arm 724 which is grounded. The melodia stop switch includes a second movable switch arm 726, and this is electrically and mechanically connected to the movable switch arm 724, and further is connected by a wire to pin 2 of the plug 714. The second movable switch arm 726 is engageable with a fixed switch arm which is connected to pin 1 of plug 714.

Wire 646, besides being connected by wire 644 to the top of the right hand section of the lower manual balance switch 592, is also connected to a fixed switch arm of an echo string stop switch 728. This fixed switch arm is normally engaged by a movable switch arm 730 which is connected by a wire to a fixed switch arm of a lyric flute stop switch 732. A second switch arm of movable nature and identified by the numeral 734 is included in the echo string stop switch and is connected by a wire to pin 8 of the plug 714. This second movable switch arm is engageable with a fixed switch arm connected by a wire to pin 7 of the plug 714.

The previously mentioned fixed switch arm of the lyric flute stop switch is normally engaged by a movable switch arm 736, the latter being grounded. A second movable switch arm 738 is electrically and mechanically connected to the switch arm 736, and is connected to pin 6 of the plug 714. The movable switch arm 738 is movable into engagement with a fixed switch arm which is connected to pin 5 of the plug 714.

Pin 10 of the plug 714 is grounded, and pin 11 is connected by a wire 740 to a plug 742 adapted to be plugged into the audio amplifier input jack 324.

The tone coloring unit 80 is shown at the upper right portion of FIG. 60, and includes an input socket 744 receiving the plug 664, an input socket 746 receiving the plug 700, a four prong socket 748, and a socket 750 receiving the plug 714. The various sockets are connected by a plurality of filters hereinafter to be described to a tone output line 752 leading to contact 11 of the socket 750. This, in turn, is connected through the plug 714 to the line 740 leading to the pin and jack connection to the input of the audio amplifier. A jack 754 is provided at the extreme upper right corner of the tone color unit 80 for receiving a pin or plug carrying the output of the chord unit. The jack 754 is connected through a resistor 756, past a shunting 100K resistor 758 and .0033 mfd. capacitor 760 to a 1 meg. resistor 762, the latter being connected to the output line 752.

Contact 1 of the socket 754 is connected to a tone coloring filter 764 comprising a series input 100K resistor 766, a shunting .0022 mfd. capacitor 768, and a series 1 meg. resistor 770, and hence to the output line 752.

Pin 2 of the socket 744 is connected through a piccolo tone filter 772 to the output line 752. The values of the piccolo filter are the same as those of the tone coloring filter.

Pin 3 of the socket 744 is connected to the output line 752 through a concert flute filter 774 of similar construction and value to the preceding mentioned filters. Pin 4 similarly is connected through a French horn filter 776 to the output line 752. The French horn filter is similar to those previously described, except that the shunting capacitor 778 is of .0033 mfd. The remaining contacts of socket 744 are not connected, except for contact 8, which is grounded.

Contact 8 of the socket 746 is connected to a muted horn filter 780, and hence to the output line 752. The muted horn filter comprises an input 4.6 henry choke 782, a shunting capacitor of .015 mfd. identified by the numeral 784, a series .0033 mfd. capacitor 786, a series 470K resistor 788, a shunting 100K resistor 790, and a series 1 meg. resistor 792.

Contact 7 of the socket 746 is connected to the output line 752 by an obe filter 794. The oboe filter includes a shunting .3 henry choke 796, a series 1 meg. resistor 798, a shunting 100K resistor 800, and a series 1 meg. resistor 802. The series resistor 798 is connected in parallel to a .0022 mfd. capacitor 804.

Pin 5 of socket 746 is connected through a soft string filter 806 to the output line 752. This filter comprises a 47K input series resistor 808, a shunting combination of a 1 meg. resistor 810 and .6 henry choke 812, a shunting capacitor 814 of .01 mfd., a shunting 100K resistor 816, and a series resistor 818 of 1 meg. It might be well to mention that the 1 meg. resistors connecting the heretofore mentioned filters to the output line, and similar 1 meg. resistors hereinafter to be described, are provided for preventing interaction among the various filter circuits.

Pin 6 of the socket 746 is connected to the oboe input 820 of a filter 822 comprising a grounded 150K resistor 824 and a capacitor 826. The capacitor is connected to a line 828 leading to contact 1 of the four contact socket 748. The filter 822 includes another grounded 150K resistor 830 and another .1 mfd. capacitor 832 connected to the line 828.

An identical filter 834 is depicted immediately to the left of the filter 822. One input or terminal 836 thereof is connected to pin 3 of the socket 746, while the other terminal 838 is connected to contact 4 of the socket 746, the two halves of the filter 834 respectively being viola and soft string. An intermediate terminal 840 is connected to the line 828.

Another filter of similar appearance and having similar element values is provided at 842, being shown to the right and slightly above the last two mentioned filters. One terminal 844 of this filter is connected to pin 2 of the socket 750, another terminal 846 is connected to contact 3 of the socket 740, while the intermediate terminal 848 is connected to contact 3 of the four prong socket 748.

Another identical filter 850 is shown immediately below the filter 842. One terminal 852 thereof is connected to contact 5 of the socket 750, another terminal 854 is connected to contact 7 of the socket 750, and the intermediate terminal 856 is connected to contact 2 of the four prong socket 748.

Contact 2 of the socket 746 is connected to a viola filter 858. This filter comprises an input 3.9K resistor 860, a shunting .0047 capacitor 862, a shunting 2 henry choke 864, a series 100K resistor 866, a shunting 100K resistor 868, and the usual 1 meg. output or isolating resistor 870 connected to the output line 752.

Contact 1 of the socket 750 is connected to a melodia filter 872. This filter comprises a shunting .047 capacitor 874, a series 4.6 henry choke 880, a shunting .047 capacitor 882, a series .1 mfd. capacitor 884, a shunting 100K resistor 886, and the usual 1 meg. resistor 888 connected to the output line 752.

Contact 4 of the socket 750 is connected to a cello filter 890. This filter comprises a 47K input resistor 892, a shunting .01 capacitor 894, a series .0068 capacitor 896, a shunting 100K resistor 898, and a 1 meg. output resistor 900 connected to the line 752.

Contact 6 of the socket 750 is connected to the output line 752 via the lyric flute filter 902. This filter comprises a shunting .047 mfd. capacitor 904, a series 5.5 henry choke 906, a shunting .047 capacitor 908, a series .1 mfd. capacitor 910, and a series output 1 meg. resistor 912.

Contact 8 of the socket 750 is connected to an echo spring filter 914 comprising an input series 47K resistor 916, a shunting .01 capacitor 918, a series .0068 capacitor 920, a shunting 100K resistor 922, and a series output 1 meg. resistor 924.

Contact 9 of the socket 750 is connected to a pedal filter comprising a series 470K resistor 926, a shunting .01 mfd. capacitor 928, and a series output 1 meg. resistor 930. The entire pedal filter is designated by the number 932.

Description of the organ has now been completed. It is not seen that any point would be served by expounding at great length on the many possible combinations of filters brought about by appropriate movement of the stop tablets and corresponding stop switches. Operation of the stop tablets will be obvious to any one skilled in the organ art, and the corresponding switch operations and connections readily can be traced in the diagrams of FIGS. 6A and 6B.

The specific embodiment of the invention as herein shown and described is for illustrative purposes only. Various changes in structure will no doubt occur to those skilled in the art, and will be understood as forming a part of the invention insofar as they fall within the spirit and scope of the appended claims.

The invention is claimed as follows:

1. An electronic musical instrument comprising means for generating simple electrical oscillations corresponding to musical tones, electro-acoustic output means, means providing a tone path from said generating means to said ouput means for producing simple musical tones, oscillation distorting means, means connecting said oscillation distorting means to said generating means for producing complex electric oscillations having fundamentals and series of even and odd harmonics, and means including wave shaping means connecting said distorting means to said output means for controlling the relative amplitudes of fundamentals and harmonics to produce complex musical tones.

2. An electronic musical instrument comprising means for generating simple electrical oscillations corresponding to musical tones, electro-acoustic output means, means providing a tone path from said generating means to said output means for producing simple musical tones, oscillation distorting means including an asymmetrical conductor, means connecting said oscillation distorting means to said generating means for producing complex electric oscillations having fundamentals and series of even and odd harmonics, and means including wave shaping means connecting said distorting means to said output means for controlling the relative amplitudes of fundamentals and harmonics to produce complex musical tones.

3. An electronic musical instrument comprising means for generating simple electrical oscillations corresponding to musical tones, electro-acoustic output means, means providing a tone path from said generating means to said output means for producing simple musical tones, oscillation distorting means including an imperfect rectifier device, means connecting said oscillation distorting means to said generating means for producing complex electric oscillations having fundamentals and series of even and odd harmonics, and means including wave shaping means connecting said distorting means to said output means for controlling the relative amplitudes of fundamentals and harmonics to produce complex musical tones.

4. An electronic musical instrument comprising means for generating simple electrical oscillations corresponding to musical tones, electro-acoustic output means, means providing a tone path from said generating means to said output means for producing simple musical tones, oscillation distorting means including a metallic rectifier device, means connecting said oscillation distorting means to said generating means for producing complex electric oscillations having fundamentals and series of even and odd harmonics, and means including wave shaping means connecting said distorting means to said output means for controlling the relative amplitudes of fundamentals and harmonics to produce complex musical tones.

5. An electronic musical instrument comprising means for generating simple electrical oscillations corresponding to musical tones, electro-acoustic output means, means providing a tone path from said generating means to said output means for producing simple musical tones, oscillation distorting means including a selenium diode, means connecting said oscillation distorting means to said generating means for producing complex electric oscillations having fundamentals and series of even and odd harmonics, and means including wave shaping means connecting said distorting means to said output means for controlling the relative amplitudes of fundamentals and harmonics to produce complex musical tones.

6. An electronic musical instrument comprising a plurality of master oscillators producing substantially sine wave oscillations, a cascade of voltage dividers for each master oscillator comprising slave oscillators producing substantially sine wave oscillations at sub-harmonic frequencies of the master oscillators, oscillation distorting means connected to at least some of said oscillators for producing complex oscillations having fundamentals and series of even and odd harmonics, tone output means, and independent means connecting at least some of said oscillators and some of said distorting means to said output means for respectively producing simple and complex musical tones.

7. An electronic musical instrument comprising a plurality of slug tuned Hartley master oscillators producing substantially sine wave oscillations, a cascade of voltage dividers for each master oscillator comprising parallel-T slave oscillators producing substantially sine wave oscillations at sub-harmonic frequencies of the master oscillators, oscillation distorting means connected to at least some of said oscillators for producing complex oscillations having fundamentals and series of even and odd harmonics, tone output means, and independent means connecting at least some of said oscillators and some of said distorting means to said output means for respectively producing simple and complex musical tones.

8. An electronic musical instrument comprising a plurality of master oscillators producing substantially sine wave oscillations, a cascade of voltage dividers for each master oscillator comprising slave oscillators producing substantially sine wave oscillations at sub-harmonic frequencies of the master oscillators, a plurality of oscillation distorting means each comprising a rectifier device having an appreciable conduction in the back direction connected to at least some of said oscillators for producing complex oscillations having fundamentals and series of even and odd harmonics, tone output means, and independent means connecting at least some of said oscillators and some of said distorting means to said output means for respectively producing simple and complex musical tones.

9. An electronic musical instrument comprising a plurality of slug tuned Hartley master oscillators producing substantially since wave oscillations, a cascade of voltage dividers for each master oscillator comprising parallel-T slave oscillators producing substantially sine wave oscillations at sub-harmonic frequencies of the master oscillators, a plurality of oscillation distorting means each comprising a rectifier device having an appreciable conduction in the back direction connected to at least some of said oscillators for producing complex oscillations having fundamentals and series of even and odd harmonics, tone output means, and independent means connecting at least some of said oscillators and some of said distorting means to said output means for respectively producing simple and complex musical tones.

10. An electronic musical instrument as set forth in claim 9 wherein each rectifier device comprises a selenium diode.

11. An electronic musical instrument comprising means for generating a plurality of substantially sine wave oscillations, means for generating a plurality of complex oscillations having fundamentals and series of even and odd harmonics, means including key operated switch means for connecting the substantially sine wave generating means according to a plurality of organ stops of simple wave form, means including key operated switch means for connecting the complex oscillation generating means according to a plurality of organ stops of complex wave form, an amplifier having input and output means, a loudspeaker connected to said output means, a plurality of cathode followers equal in number to the plurality of organ stops of complex wave form, means respectively connecting the complex wave form organ stop connecting means to said cathode followers to prevent interaction, said cathode followers being connected to the input means of said amplifier, and means connecting the simple wave form organ stop connecting means to the input means of said amplifiers independently of said cathode followers.

12. An electronic musical instrument as set forth in claim 11 and further including a tone filter unit through which all of the organ stop connecting means are connected to the input means of said amplifier.

13. An electronic musical instrument as set forth in claim 11 wherein the complex wave generating means comprise oscillation distorting means connected to at least some of the substantially sine wave generating means.

14. An electronic musical instrument as set forth in claim 13 wherein the oscillation distorting means comprises a rectifier having an appreciable back conduction.

15. An electronic musical instrument as set forth in claim 14 wherein the rectifier comprises a selenium diode.

References Cited in the file of this patent

UNITED STATES PATENTS

| 2,287,105 | Kannenberg | June 23, 1942 |
| 2,535,323 | Skellett | Dec. 26, 1950 |
| 2,694,954 | Kock | Nov. 23, 1954 |

FOREIGN PATENTS

| 745,436 | Great Britain | Feb. 29, 1956 |

OTHER REFERENCES

Electronic Eng., "A Waveform Synthesizer," by T. S. Fox, pages 374 to 378, September 1955.